United States Patent [19]
Felser, Jr.

[11] 3,742,570
[45] July 3, 1973

[54] BEARING REMOVAL FIXTURE

[76] Inventor: Joseph Felser, Jr., 2208 Segovia Circle, Coral Gables, Fla.

[22] Filed: Apr. 6, 1972

[21] Appl. No.: 241,786

[52] U.S. Cl. ............................................. 29/201
[51] Int. Cl. .......................................... B23p 19/04
[58] Field of Search ............. 29/201, 200 H, 203 P, 29/200 D

[56] References Cited
UNITED STATES PATENTS
3,008,226 11/1961 Kellerman............................ 29/201

Primary Examiner—Thomas H. Eager
Attorney—Lloyd J. Andres

[57] ABSTRACT

A hand operated fixture adapted to remove bushings or bearings press fitted into a bearing support without the removal of the shaft from its normal running position. The fixture is operated by a screw means threaded therein coaxial with the outer end of the shaft. The bushing is withdrawn by the pressure applied by a half cylindrical sleeve against the rear of the bearing resulting from the hand rotation of the screw against the end of the shaft normally retained in the bearing. The fixture may include a selected number of interchangeable sleeves for bearings of different diameters.

3 Claims, 7 Drawing Figures

PATENTED JUL 3 1973 3,742,570
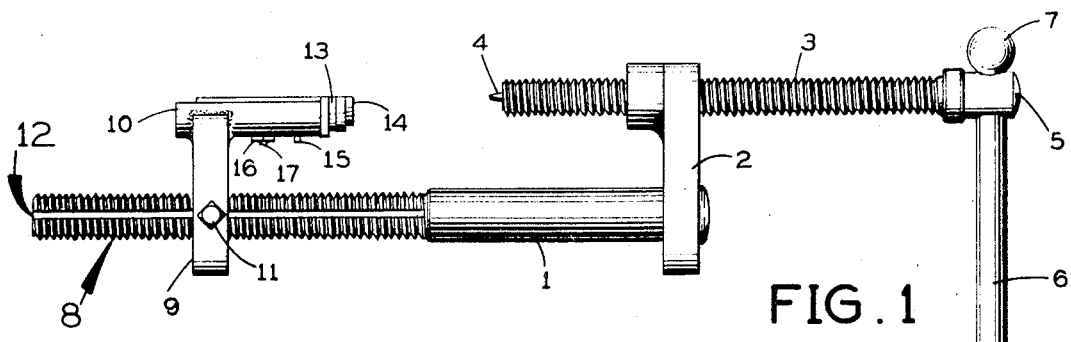
FIG. 1
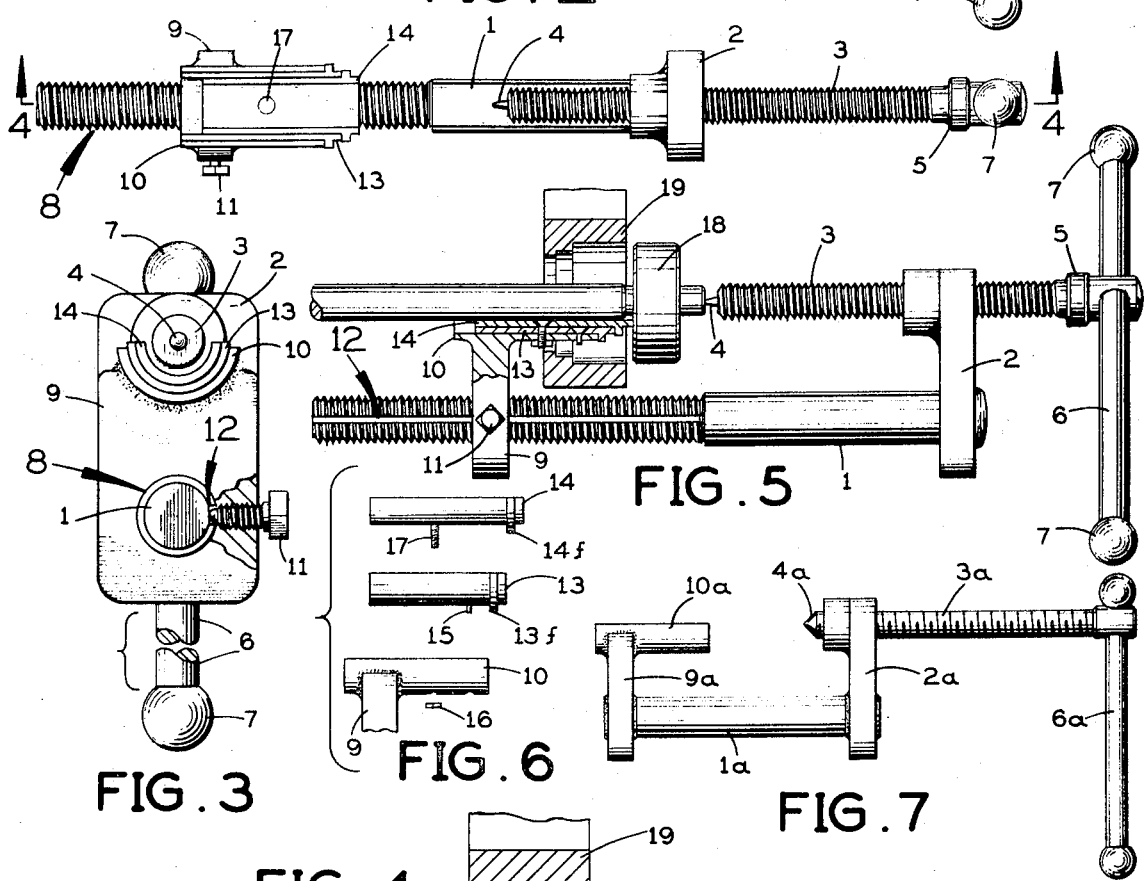
FIG. 2
FIG. 5
FIG. 3
FIG. 6
FIG. 7
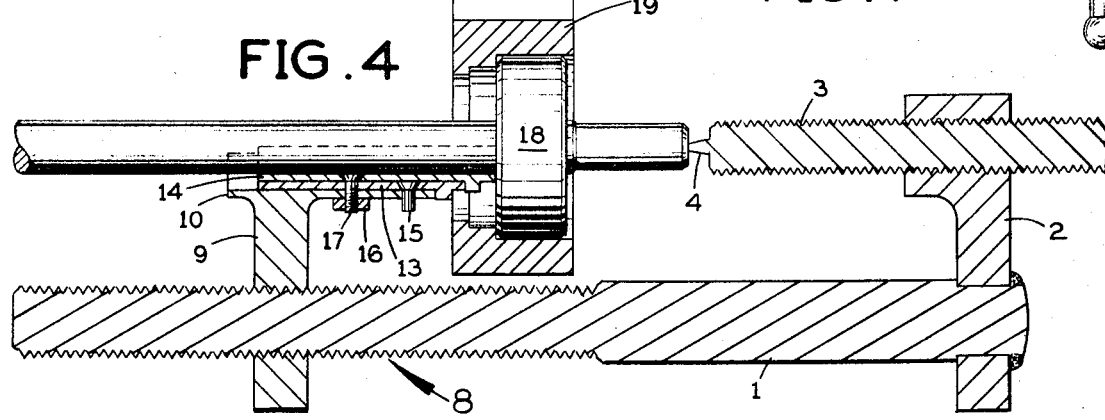
FIG. 4

BEARING REMOVAL FIXTURE

This invention relates in general to bearing service tools and more particularly a threaded clamp type fixture for removing bushings and bearings which are snugly retained or press fitted into a variety of bearing supports without the removal of the shaft from its support.

Prior to this invention it was necessary to disassemble and remove the rotary shaft and related elements supported by a bushing or bearing prior to the extraction of the bearing for replacement, which involved excessive labor and cost.

A principal object of the invention is the provision of a screw type clamping fixture which contains a removable selective size half sleeve for positioning around the shaft and against the rear of the bearing or bushing and a hand rotated screw means engaged with the outer end of the shaft to extract the bearing or bushing from the forward end of the shaft when operated.

A further object of the invention is the provision of a fixture having a predetermined variety of sizes of half sleeves to match a corresponding number of shaft sizes for the extraction of the bearings thereon.

Another object of the invention is the provision of an extraction device for forcing the bearing in a forward direction from the rear thereof by means of a screw having a pointed end engaged with the center cavity in the forward end of the shaft.

These and other objects and advantages in one embodiment of the invention are described and shown in the following specification and drawing, in which:

FIG. 1 is a side elevation of the bushing and bearing removal fixture.

FIG. 2 is a top plan view of the fixture shown in FIG. 1.

FIG. 3 is a left hand end view of the fixture shown in FIG. 1 with portions thereof broken away.

FIG. 4 is a cross sectional view taken through section line 4—4, FIG. 2, illustrating the position thereof for the removal of a typical ball bearing from a support.

FIG. 5 illustrates the bearing after having been removed by the manual rotation of the handle.

FIG. 6 illustrates two additional size reduction sleeves for two bushings of two smaller diameters.

FIG. 7 illustrates a simplified version of the fixture for removal of a particular size bearing in a particular support.

Referring to FIGS. 1, 2, and 3, the bearing extractor has a main cylindrical bar 1 on which a forward offset member 2 is secured, preferably by welding, which member is threaded at the upper end portion to receive an extraction screw 3 on which the forward end terminates in a coaxial conical point 4 and the rearward end 5 thereof has a transverse bore therethrough to retain a slidable handle member 6 which is retained by spherical heads 7—7. The axis of the screw is positioned for parallel movement with respect to bar 1. The threads 8 on the bar 1 are engaged with a mating offset member 9 which includes a half cylindrical sleeve 10, preferably welded to the offset member 9, as shown, and the sleeve 10 positioned in coaxial alignment with the axis of screw 3 by a dog point set screw 11 which engages a longitudinal slot 12 in the bar 1. Thus it is apparent that the sleeve 10 may be adjusted to accommodate a wide range of movement to span the width of various bushing or bearing supports for the extraction of the bearing or bushing therein. A pair of auxiliary sleeves 13 and 14 for two smaller diameter shafts are coaxially nexted in sleeve 10, better described in FIG. 6, wherein the sleeve 10 is provided with a transverse hole and auxiliary sleeve 13 is provided with a threaded stud 15 and adapted to be secured coaxially within sleeve 10 by a nut 16. The smallest sleeve 14 is coaxially nested within sleeve 13 and is provided with a longer threaded stud 17 which projects through a hole in sleeve 13 and extends through sleeve 10 and held by a nut 16. Each of the sleeves 13 and 14 are provided with an integral flange 13f and 14f, respectively for providing the proper extraction force without stressing the studs 15 and 17.

FIG. 4 illustrates a typical bearing 18 held in a support 19 which is an example of the use of the smallest sleeve 14.

FIG. 5 illustrates the extraction of the bearing 18 from the support 19 by the rotation of screw 3 by handle member 6 wherein the sleeve 14 was urged against the inner end of bearing 18 and forced the bearing from the support, as shown.

FIG. 7 illustrates an auxiliary extraction fixture adapted for limited use permanently securing the bar 1a to offset members 2a and 9a, such as by welding, which provides a fixed distance between the single sleeve 10a and the offset support for the extraction screw.

In operation and referring to FIGS. 3, 4, and 5, it is apparent that the bearing support 19 must be of the character that will permit the bar 1 and the offset member 9 to be positioned for contact of the end of the sleeve to make mating contact with the rear surface of the bearing to be removed. It is then apparent that when the point 4 of the screw 3 is engaged in the conical center of the shaft in the bearing that the rotation of the handle member 6 will urge the sleeve against the rear of the bearing 18 and move the bearing along its axis to disengage same from the fixed support 19 and the shaft. It is apparent that the inside diameter of the selected sleeve nested against the shaft must be the same diameter as the outside diameter of the shaft and coaxial therewith.

FIG. 7 illustrates a simplified version of the fixture wherein the offset member 9a is integral with the main bar 1 and the sleeve 10a is integral with the offset member 9a and coaxial with the extraction screw 3a which is adapted to remove bearings of predetermined size.

It is to be understood that certain modifications in construction are intended to come within the scope and teachings of the above specification.

Having described my invention, I claim:

1. In a fixture for removing bearings from a support and a shaft therein comprising an elongated straight bar member having a first offset member integral with one end thereof with said first offset member threaded to receive a pointed extraction screw to be threaded through said first offset member along said bar member with the axis thereof in predetermined parallel spaced relation with said bar member, a handle means secured to the outer end of said screw, a second offset member integral with the opposite end of said bar member having a half cylindrical sleeve of uniform wall thickness integral with the outer end of said second offset member with the axis of said sleeve coaxial with the axis of said screw whereby a bearing may be forced from said support by engagement with the inner end of said half cylindrical sleeve when said screw is rotated by said handle means with the end of said screw coaxially engaged with the outer end of said shaft.

2. The construction recited in claim 1 including an alternate second offset member threaded on a portion of said bar, an alternate second offset member adjustably threaded on said threaded portion of said bar including an integral half cylindrical sleeve of predetermined wall thickness integral therewith, said bar having a longitudinal groove along the threaded portion thereof parallel the axis of said bar and a lateral lock screw in said alternate second offset member engaged in said groove for holding the axis of said half cylindrical sleeve coaxial with the axis of said extraction screw for holding said sleeve coaxial with said extraction screw and predetermined spacing between the inner end of said sleeve and the said first offset member.

3. The construction recited in Claim 2 including at least two half cylindrical sleeves nested together with the outside diameter of the largest equal to the inside diameter of the integral sleeve including screw and nut means for holding said auxiliary sleeves in nested position for coaxial alignment with said screw, each said auxiliary sleeve having a flange around the front end thereof for bearing together against the inner end of said integral sleeve whereby bearings of at least three predetermined diameters may be extracted from the bearing support and shaft therein.

* * * * *